(12) United States Patent
Haselhorst et al.

(10) Patent No.: US 7,660,908 B2
(45) Date of Patent: Feb. 9, 2010

(54) IMPLEMENTING VIRTUAL PACKET STORAGE VIA PACKET WORK AREA

(75) Inventors: Kent Harold Haselhorst, Byron, MN (US); Kerry Christopher Imming, Rochester, MN (US); John David Irish, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1356 days.

(21) Appl. No.: 10/427,886

(22) Filed: May 1, 2003

(65) Prior Publication Data

US 2005/0021837 A1 Jan. 27, 2005

(51) Int. Cl.
G06F 15/167 (2006.01)
G06F 15/173 (2006.01)
G06F 12/00 (2006.01)
(52) U.S. Cl. .................. 709/238; 709/213; 711/100
(58) Field of Classification Search ................. 709/213, 709/238; 711/100, 147; 710/1, 52
See application file for complete search history.

(56) References Cited

U.S. PATENT DOCUMENTS

| 4,967,344 | A | 10/1990 | Scavezze et al. |
|---|---|---|---|
| 5,001,705 | A | 3/1991 | Kobatake et al. |
| 6,847,645 | B1 | 1/2005 | Potter et al. |
| 6,850,999 | B1 | 2/2005 | Mak et al. |
| 2001/0027494 | A1 | 10/2001 | Deo et al. |
| 2001/0036180 | A1 | 11/2001 | Kato et al. |
| 2002/0019902 | A1 | 2/2002 | Christie |
| 2004/0034743 | A1* | 2/2004 | Wolrich et al. ............... 711/132 |
| 2004/0037276 | A1* | 2/2004 | Henderson et al. .......... 370/371 |
| 2004/0073635 | A1* | 4/2004 | Narad et al. ................. 709/221 |

* cited by examiner

*Primary Examiner*—Nathan Flynn
*Assistant Examiner*—Joshua Joo
(74) *Attorney, Agent, or Firm*—Joan Pennington

(57) ABSTRACT

A method, apparatus and computer program product are provided for implementing virtual packet storage via packet work area (PWA) in a network processor system. A mapping area including a packet work area and a corresponding set of packet segment registers (PSRs) are provided. A PSR is loaded with a Packet ID (PID) and a packet translation unit maps the packet data into the corresponding PWA. The PWA address defining an offset into the packet is translated into a physical address. The packet translation unit redirects loads and stores of the PWA into the correct data buffer or buffers in system memory. Packets include one or more data buffers that are chained together, using a buffer descriptor providing the packet physical address. The buffer descriptor points to a data buffer for the packet and to a next buffer descriptor.

9 Claims, 6 Drawing Sheets

PACKET STRUCTURE - PHYSICAL

IMPLEMENTING VIRTUAL PACKET STORAGE VIA PACKET WORK AREA

RELATED APPLICATIONS

Related United States patent applications assigned to the present assignee are being filed on the same day as the present patent application including:

U.S. patent application Ser. No. 10/427,864, U.S. Pat. No. 7,240,166 issued Jul. 3, 2007, by Paul Allen Ganfield, and entitled "METHOD AND APPARATUS FOR IMPLEMENTING PACKET WORK AREA ACCESSES AND BUFFER SHARING"; and U.S. patent application Ser. No. 10/427,865, by Paul Allen Ganfield, Kent Harold Haselhorst, Kerry Christopher Imming, and John David Irish, and entitled "METHOD AND APPARATUS FOR IMPLEMENTING PACKET COMMAND INSTRUCTIONS FOR NETWORK PROCESSING".

FIELD OF THE INVENTION

The present invention relates generally to the data processing field, and more particularly, relates to a method, apparatus and computer program product for implementing virtual packet storage via packet work area.

DESCRIPTION OF THE RELATED ART

When a network processor manipulates packet data, it is desirable that the packet appear to exist in a contiguous area in real memory. In this way, packet data can be manipulated using normal load and store instructions through the processor's cache. The contiguous memory area will contain packet data as well as control information related to the packet.

A need exists for a mechanism for mapping packet data into a processor's address space.

SUMMARY OF THE INVENTION

A principal object of the present invention is to provide a method, apparatus and computer program product for implementing virtual packet storage via packet work area. Other important objects of the present invention are to provide such method, apparatus and computer program product for implementing virtual packet storage via packet work area substantially without negative effect and that overcome many of the disadvantages of prior art arrangements.

In brief, a method, apparatus and computer program product are provided for implementing virtual packet storage via packet work area in a network processor system. A mapping area including a packet work area and a corresponding set of packet segment registers are provided. A packet segment register is loaded with a Packet ID and a packet translation unit maps the packet data into the corresponding packet work area. The PWA address, defining an offset into the packet, is translated into a physical address.

In accordance with features of the invention, the packet translation unit redirects loads and stores of the PWA into the correct data buffer or buffers in system memory. Packets include one or more data buffers that are chained together, using a buffer descriptor providing the packet physical address. The buffer descriptor points to a data buffer for the packet and to a next buffer descriptor.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
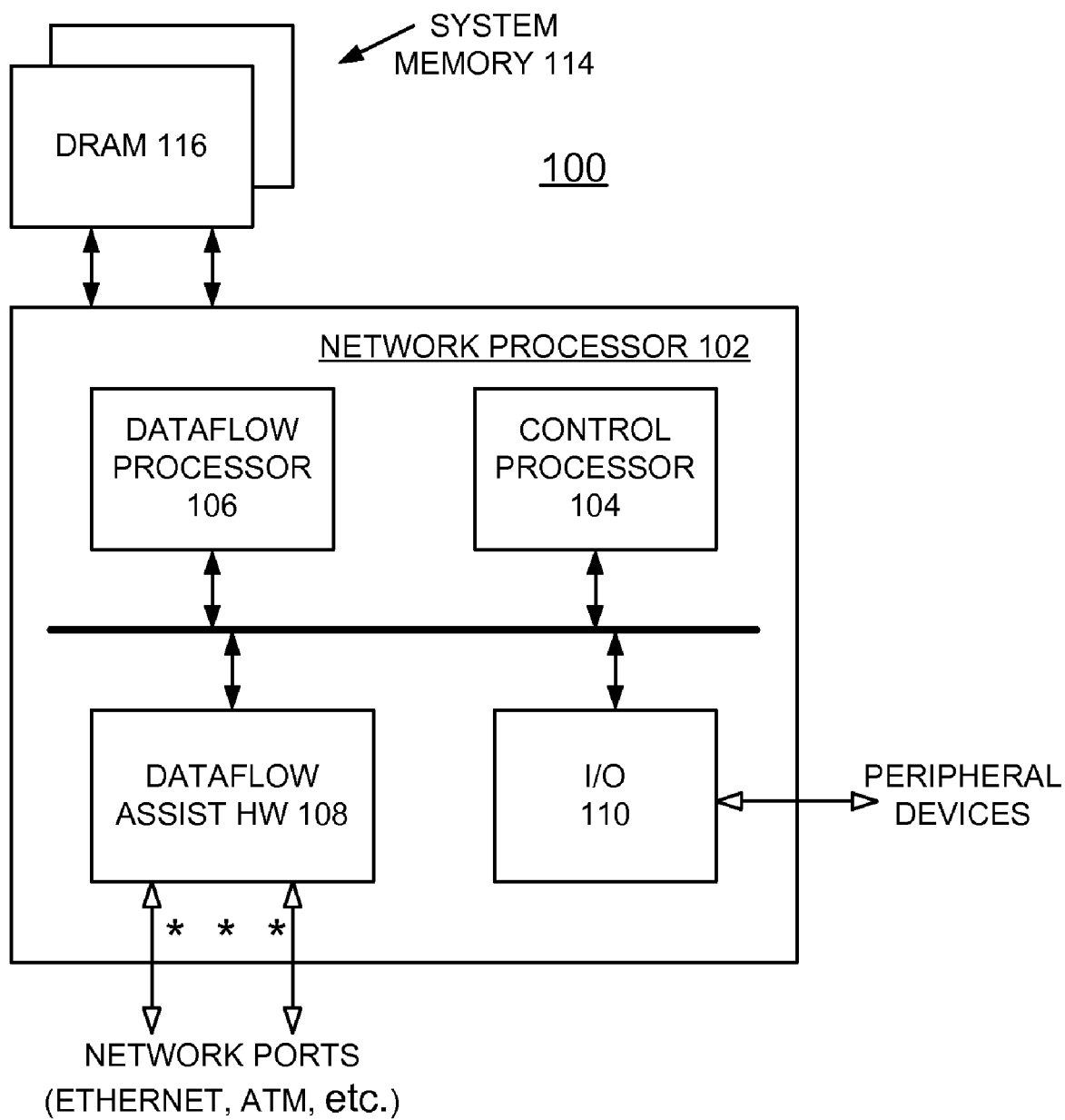
FIG. 1 is a block diagram representation illustrating a network processor system for implementing virtual packet storage via packet work area in accordance with the preferred embodiment.

Having reference now to the drawings, in FIG. 1, there is shown a network processor system generally designated by the reference character 100 for carrying out methods for implementing packet work area accesses and buffer sharing of the preferred embodiment. As shown in FIG. 1, network processor system 100 includes a network processor 102 coupled to multiple network ports for communicating using known network protocols, such as, an Asynchronous Transfer Mode (ATM), Ethernet, and the like. Network processor 102 includes a control processor 104, a dataflow processor 106 coupled by a network processor bus to dataflow assist hardware (HW) 108 coupled to the network ports and an input/output (I/O) 110 coupled to peripheral devices. Network processor system 100 includes a system memory 114 including a dynamic random access memory (DRAM) 116.

Network processor 102 can be implemented with various standard processors, for example, with one of the PowerPC® line of processors manufactured by International Business Machines Corporation.

In accordance with features of the preferred embodiment, a mapping area called a Packet Work Area (PWA) and a corresponding set of Packet Segment Registers (PSRs) are provided. The packet work area (PWA) gives software access to a packet and extends the concept of virtual addressing used in a standard microprocessor. Packets consist of one or more buffers that are chained together, using a buffer descriptor which points to a data buffer for the packet and to a next buffer descriptor. An address in the PWA is an offset into the packet and is translated to a physical address to complete the PWA operation. Loading a PSR with a Packet ID (PID) causes the hardware to map the requested packet data into the corresponding PWA. Packet translation hardware of the preferred embodiment translates the PWA address into a physical address redirecting loads and stores of the PWA into the correct data buffer or buffers in system memory 114.

Figure 2:
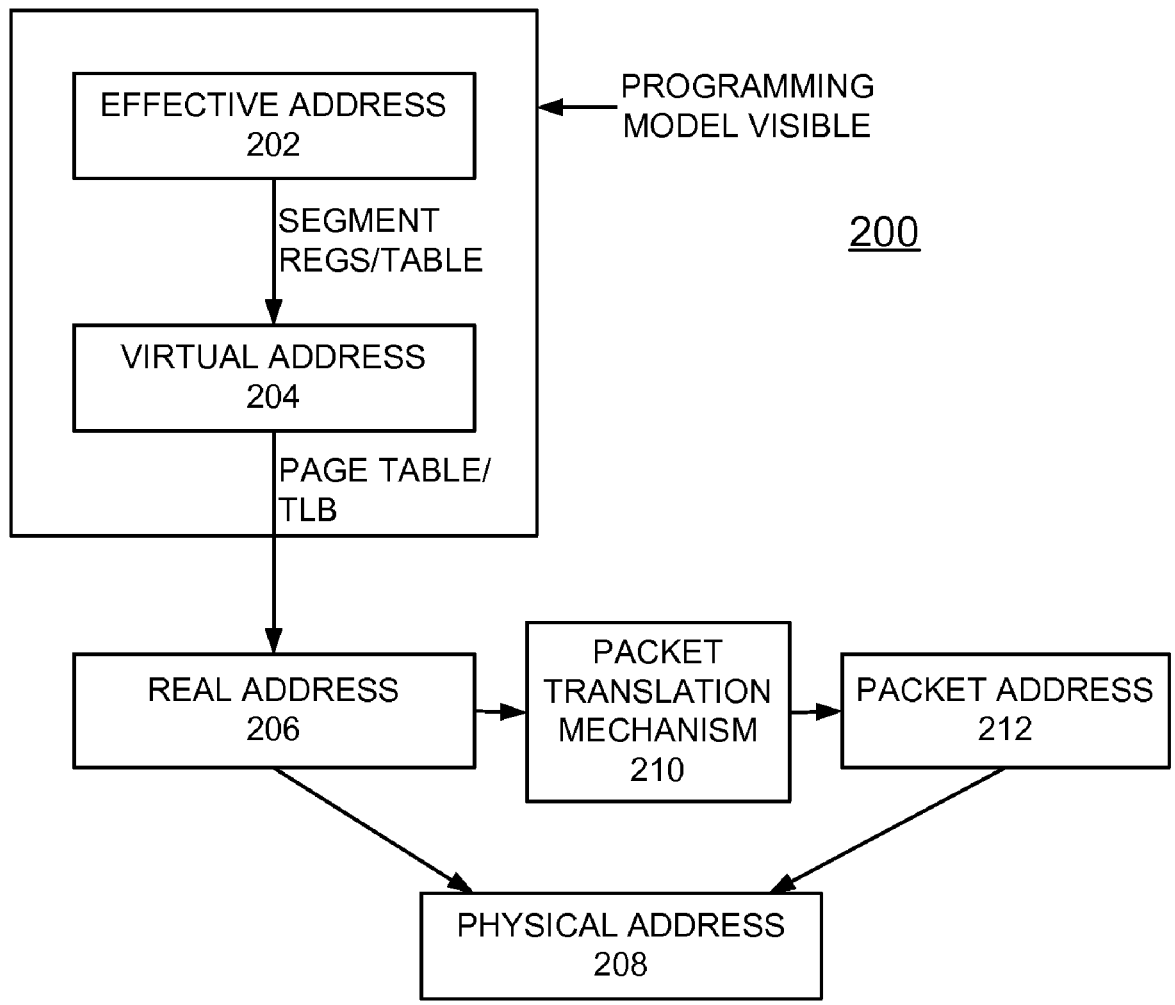
FIG. 2 is a block diagram representation illustrating a packet translation unit in accordance with the preferred embodiment.

Referring now to FIG. 2, there is shown a packet translation unit generally designated by the reference character 200 in accordance with the preferred embodiment. In the packet translation unit 200, an effective or logical address is received as indicated in a block 202. The effective address 202 is translated to a virtual address 204 using segment registers or table as indicated in a line labeled SEGMENT REGS/ TABLE.

The virtual address 204 is translated into a real address as indicated in a block 206 and the result is saved in a translation lookaside buffer (TLB) and all current mappings of virtual to real addresses are stored as entries in a page table in system memory as indicated in a line labeled PAGE TABLE/TLB. Real address 206 is translated into a physical address as indicated in a block 208.

A packet translation mechanism as indicated in a block 210 of the preferred embodiment maps the real address 206 for a packet to a packet address 212. A Packet Work Area (PWA) address of the preferred embodiment is translated into the packet address or packet address register (PAR) 212 as illustrated and described with respect to FIGS. 5A and 5B. The Packet Work Area (PWA) is illustrated and described with respect to FIGS. 3 and 4. The packet address 212 is mapped into the physical address 208.

Figure 3:
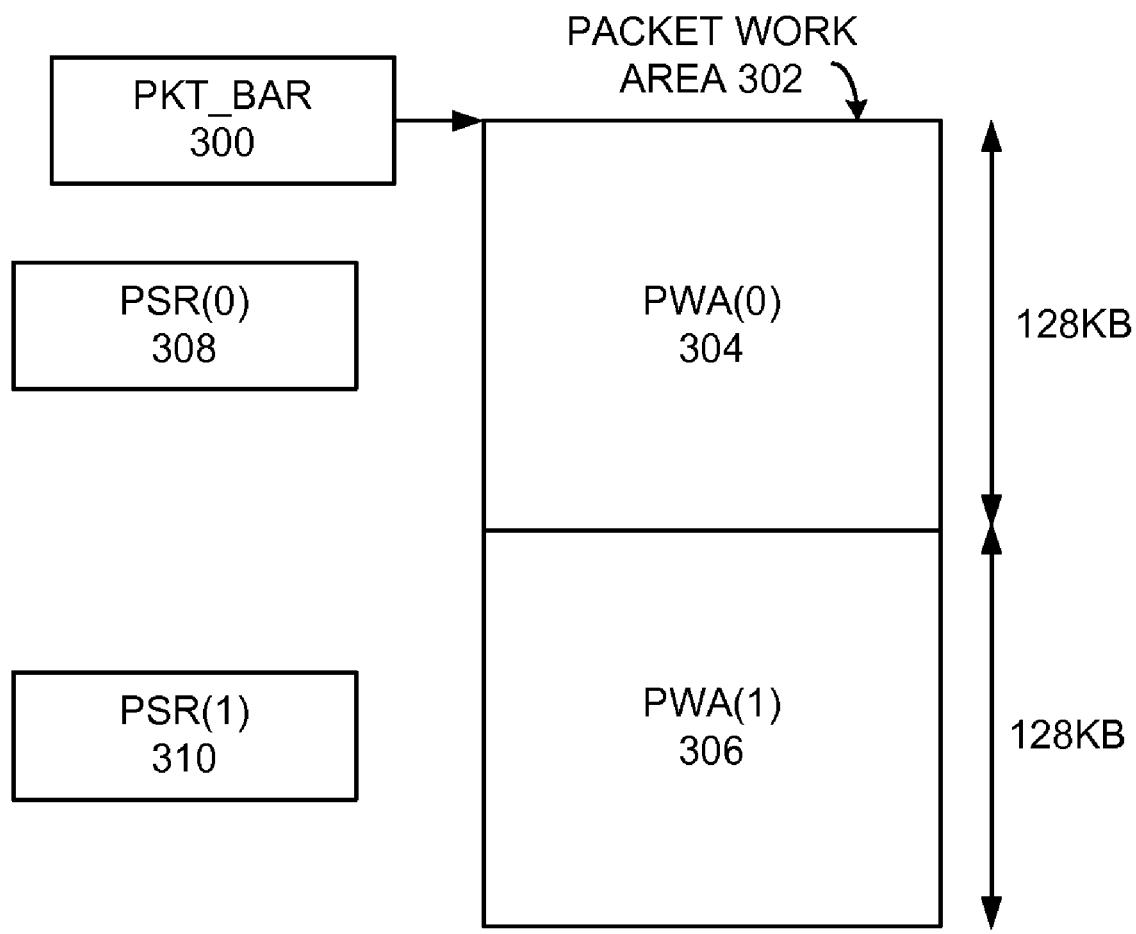
FIG. 3 is a block diagram representation illustrating a packet work area (PWA) and a corresponding set of packet segment registers (PSRs) of the packet translation unit of FIG. 2 in accordance with the preferred embodiment.

Referring now to FIG. 3, the packet translation mechanism 210 includes a packet base address register as indicated in a block PKT_BAR 300 defining an area of system address space where a packet work area (PWA) 302 is located. A set of Packet Work Areas PWA (0) 304, PWA (1) 306 and a corresponding set of packet segment registers (PSRs) 308, 310 are included in the packet translation mechanism 210 in accordance with the preferred embodiment.

A packet ID is loaded into a PSR (0) 308 or PSR (1) 310, to map the requested packet data into the corresponding PWA (0) 304 or PWA (1) 306. Each PWA (0) 304, PWA (1) 306 includes, for example, 128 KB area of system address space.

Packet translation unit 200 redirects loads and stores of the PWA (0) 304, PWA (1) 306 into the correct data buffer or buffers in system memory 114 using the real packet address stored in PAR 212 that is mapped to provide the physical address 208. The PWA 302 allows software to access packet data without concern for the details of the hardware buffer sizes or hardware allocation mechanism.

Figure 4:
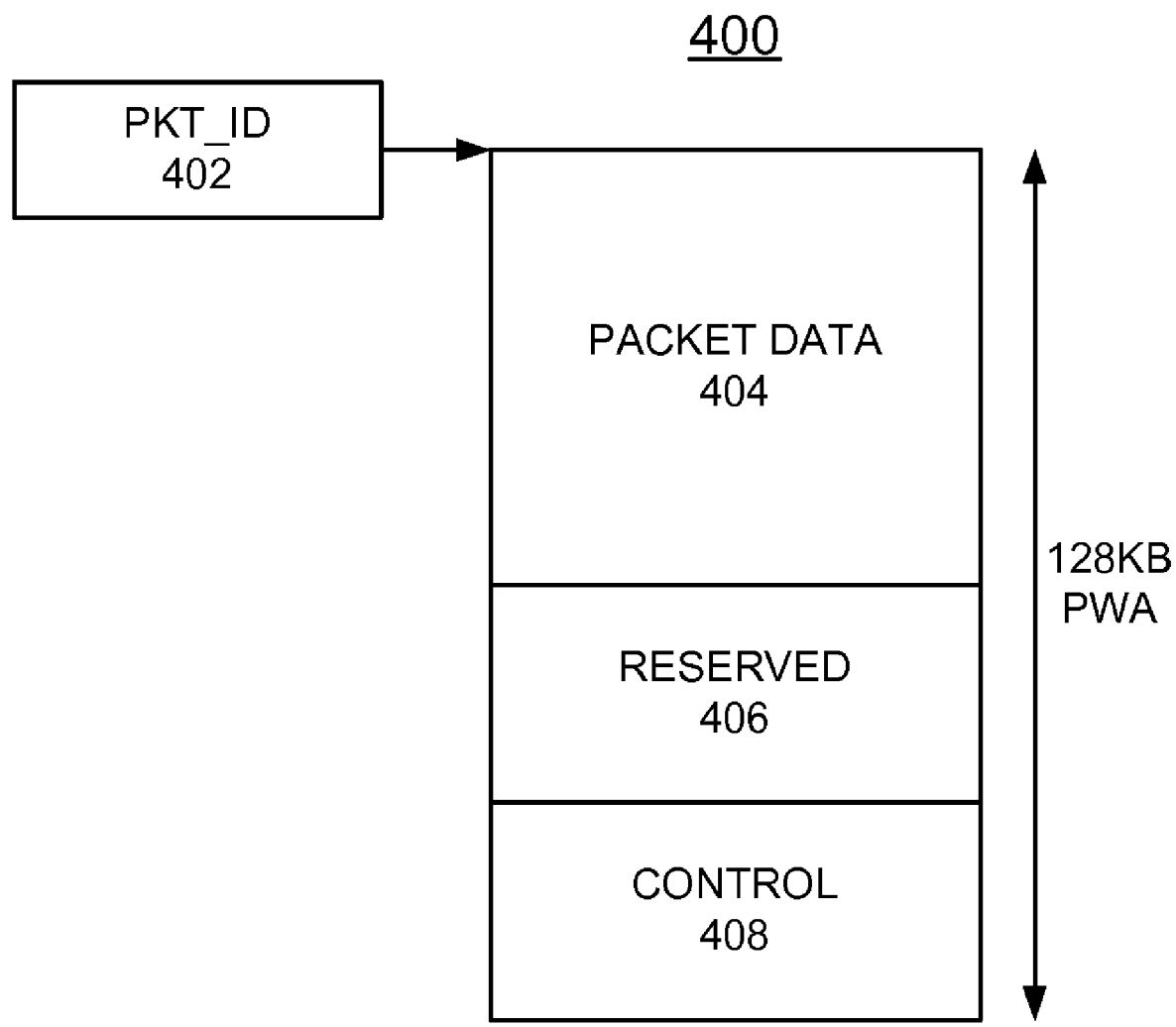
FIG. 4 is a block diagram representation illustrating a logical packet structure with a corresponding packet ID of the packet translation unit of FIG. 2 in accordance with the preferred embodiment.

FIG. 4 illustrates a logical packet structure generally designated by the reference character 400 in accordance with the preferred embodiment. A packet ID 402 used by the packet translation mechanism 210 points to PWA (0) 304 or PWA (1) 306 of the PWA 302 of FIG. 2. The logical packet structure 400 includes packet data 404, a reserved area 406, and packet control 408.

Figure 5A:
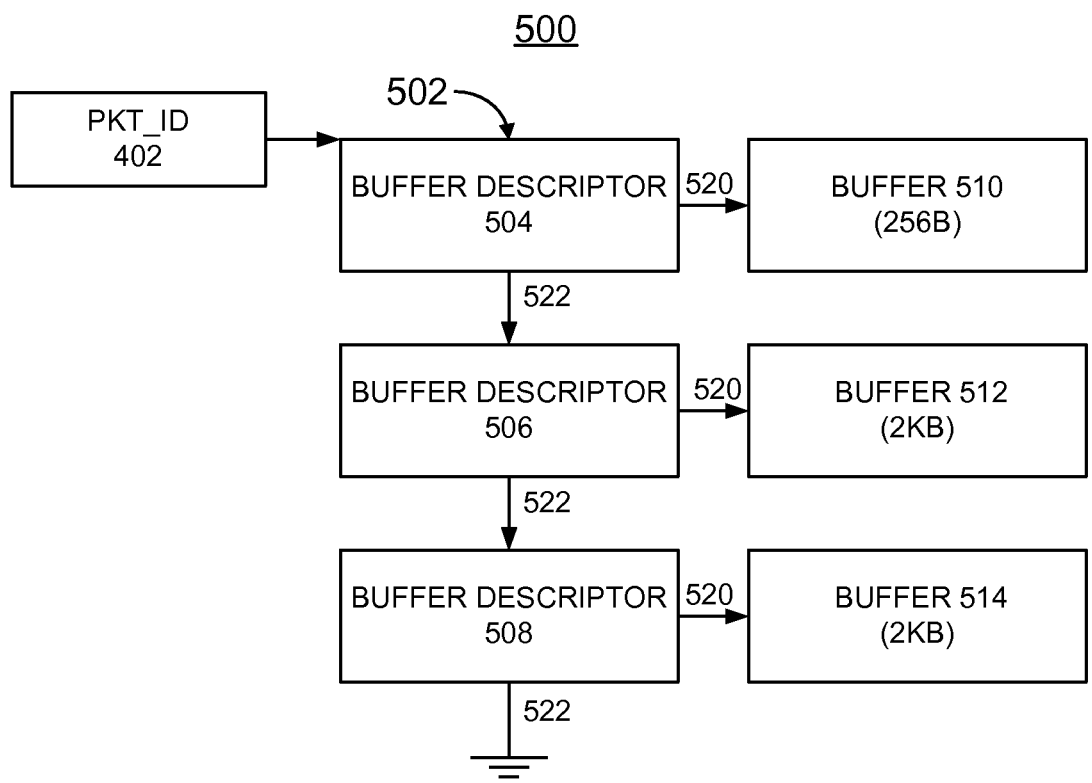
FIG. 5A is a block diagram representation illustrating an exemplary physical packet structure of the packet translation unit of FIG. 2 in accordance with the preferred embodiment.
Figure 5B:
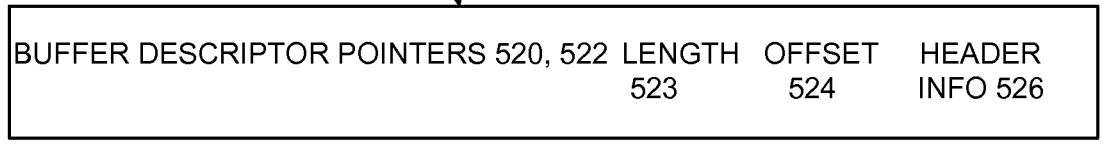
FIG. 5B is a block diagram representation illustrating a cache containing buffer descriptors of the physical packet structure of FIG. 5A in accordance with the preferred embodiment.

Referring now to FIGS. 5A and 5B, an exemplary physical packet structure generally designated by the reference character 500 in accordance with the preferred embodiment is illustrated in FIG. 5A. The packet ID 402 points to a chain 502 of buffer descriptors 504, 506, 508 respectively pointing to a respective buffer 510, 512, and 514 with a pointer indicated at a respective line 520. As shown, buffer descriptor 504 points to a first buffer 510, such as a 256 byte buffer. Buffer descriptor 506 points to a buffer 512, such as a 2 Kbyte buffer. Buffer descriptor 508 points to a buffer 514, such as a 2 Kbyte buffer. Buffer descriptors 504, 506, 508 respectively point to a next buffer descriptor with a pointer indicated at a respective line 522.

Referring to FIG. 5B, there is shown an exemplary buffer descriptor cache generally designated by reference character 530 for storing each of the buffer descriptors 504, 506, 508. The buffer descriptor cache 530 is created to hold a number N of buffer descriptors on-chip of the network processor system 100. Each of the buffer descriptors 504, 506, 508 contains the buffer descriptor pointers 520, 522, and a length 523 of the corresponding respective buffer 510, 512, and 514. An offset 524 that equals an offset into the packet is calculated for the respective buffers 510, 512, 514 using length 523. Cache 530 contains packet header information 526 including ID and length L of the packet. The first buffer descriptor 504 is read into the buffer descriptor cache 530 when the packet is loaded into the PWA, and the additional buffer descriptors 506, 508 are read in as needed. The offset 524 of the start of the first buffer 510 is 0. The offset 524 into the packet of the second buffer 512 is the length 523 of the first packet buffer 510. The offset 524 into the packet of the next packet buffer is the sum of the previous offset 524 and buffer length 523.

For example, the offset 524 associated with buffer descriptor 504 into the packet of the second buffer 512 is the length 523 of the first packet buffer 510. The offset 524 associated with buffer descriptor 506 into the packet of the next packet buffer 514 is the sum of the previous offset 524 associated with buffer descriptor 504 and the buffer length 523 of buffer 512. The offset 524 associated with buffer descriptor 508 is the sum of the previous offset 524 associated with buffer descriptor 506 and the buffer length 523 of buffer 514.

As each buffer descriptor 504, 506 is read in, the length 523 of the respective buffer 510, 512 is added to the starting offset 524 associated with respective buffer 510, 512 to get the offset 524 into the packet of the next buffer. At any point in time, the offset 524 associated with each on-chip buffer 510, 512 and the first buffer, for example, buffer 514 that has not been read in are known.

An address in the PWA 302 is an offset into the packet and is translated to a real address to complete the PWA operation. A set of parallel compares are performed of an offset to translate against these starting offsets 524 to determine which buffer 510, 512, 514 contains the desired translate offset. Performing the parallel compares of the preferred embodiment avoids the need for walking the buffer descriptor chain 502 for each offset and is faster. For example, assume that buffer 514 contains the desired translate offset. Then, for example, subtracting the starting offset 524 of the buffer 514 from the desired translate offset gives the offset within the buffer 514, called the target byte. The next cycle the buffer descriptor 508 is read from cache 530, and the target byte is added to the address to give the translated real address, and it is subtracted from the buffer length to give the amount of the buffer left at the translated address. If the PWA operation is longer than this, it crosses a buffer, and the next buffer descriptor is read from the cache 530 to get the next real address.

If in the first part of the translate, the translate offset is larger than the offset of the start of the first off-chip buffer, that off-chip buffer descriptor is read into the cache 530. If there are no more buffer descriptors in the packet, the translate offset is larger than the packet. Additional buffers could be allocated at that point to extend the packet. If the on-chip cache 530 is full, the last buffer descriptor slot N of the cache becomes a holding place for the overflow buffer descriptor that is read in. There is no limit to the number of buffers in a packet, so reading past a certain point in these packets causes buffer descriptors to be read in one at a time. The last overflow descriptor remains on-chip so the next translate can use the last overflow descriptor if the next translate hits that same buffer overflow descriptor. This allows sequential PWA accesses to only read buffer descriptors once. The first few buffer descriptors are not removed by the overflow buffer descriptor, so accesses to the earlier part of the packet are not impacted.

In accordance with features of the preferred embodiment, key advantages are that a limited memory range is consumed by the virtual packet addressing. As a result, virtual packet storage via packet work area of the preferred embodiment can be implemented within a system-on-a-chip embedded architecture. Packet data buffers may be shared, enabling an advanced set of packet manipulations. Packet data is accessed via the normal load/store mechanism, allowing a standard processor and standard data caching techniques to be used for processing packet data. The dual-sized buffers provide efficient memory allocation for small packets while providing minimal control traffic overhead for large packets. A typical allocation sequence is small, small, large.

Figure 6:
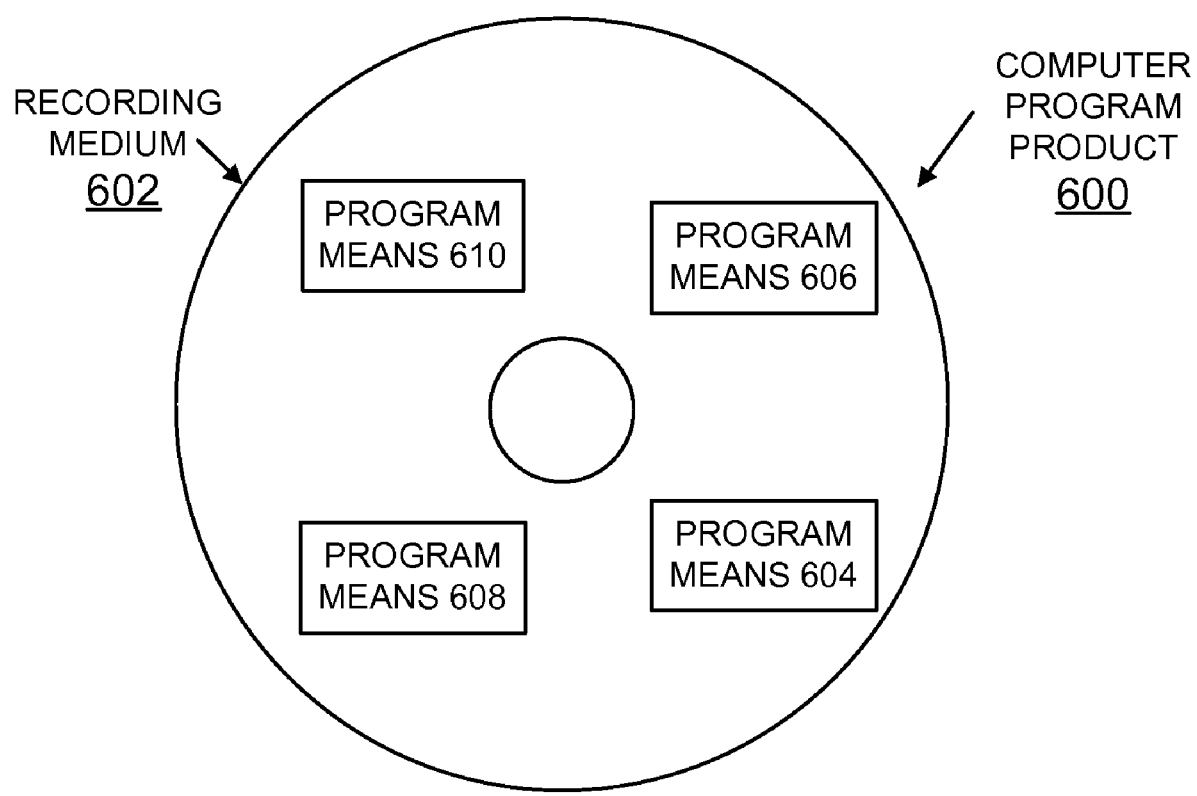
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium or a computer storage medium 602, such as, a floppy disk, a high capacity read only memory in the form of an optically read compact disk or CD-ROM, a tape, or a similar computer program product. Recording medium or computer storage medium 602 stores program means 604, 606, 608, 610 on the medium 602 for carrying out the methods for implementing virtual packet storage via packet work area of the preferred embodiment in the system 100 of FIG. 1.

A sequence of program instructions or a logical assembly of one or more interrelated modules defined by the recorded program means 604, 606, 608, 610, direct the network processor system 100 for implementing virtual packet storage via packet work area of the preferred embodiment.

While the present invention has been described with reference to the details of the embodiments of the invention shown in the drawing, these details are not intended to limit the scope of the invention as claimed in the appended claims.

What is claimed is:

1. A method for implementing virtual packet storage via packet work area in a network processor system comprising the steps of:
   providing a mapping area for virtual packet storage, said mapping area including a packet work area (PWA) providing packet data access and virtual addressing to a packet and a corresponding set of packet segment registers;
   defining an area of system address space for storing said packet work area (PWA); said area of system address space including a continuous area in real memory,
   providing a packet translation unit for translating a PWA address into a physical address;
   loading a Packet ID (PID) into one of said packet segment registers;
   mapping packet data for said PID into said PWA at a PWA address; said PWA address defining an offset into the packet; said PWA enabling said packet data access and virtual addressing without identifying hardware buffer size or hardware allocation;
   said packet translation unit translating said PWA address into said physical address and redirecting loads and stores of said PWA into at least one data buffer in a system memory.

2. The method for implementing virtual packet storage as recited in claim 1 wherein the step of defining an area of system address space for storing said packet work area (PWA) includes the step of providing a packet base address register defining said area of said system address space for storing said packet work area (PWA).

3. The method for implementing virtual packet storage as recited in claim 1 wherein the step of mapping packet data and allocating said packet data in buffers includes providing a buffer descriptor for said packet data.

4. The method for implementing virtual packet storage as recited in claim 3 wherein the step of providing said buffer descriptor includes the steps of storing a pointer in said buffer descriptor to a data buffer, said data buffer for storing said packet data.

5. The method for implementing virtual packet storage as recited in claim 4 further includes the steps of storing a pointer in said buffer descriptor to a next buffer descriptor.

6. A computer storage medium comprising memory storing a computer program product for implementing virtual packet storage via packet work area in a network processor system, said computer program product including a plurality of computer executable instructions stored on said computer storage medium, wherein said instructions, when executed by the network processor system, cause the network processor system to perform the steps of:
   providing a mapping area for virtual packet storage, said mapping area including a packet work area (PWA) providing packet data access and virtual addressing to a packet and a corresponding set of packet segment registers;
   defining an area of system address space for storing said packet work area (PWA); said area of system address space including a contiguous area in real memory;
   providing a packet translation unit for translating a PWA address into a physical address;
   loading a Packet ID (PID) into one of said packet segment registers;
   mapping packet data for said PID into said PWA at a PWA address; said PWA address defining an offset into the packet; said PWA enabling said packet data access and virtual addressing without identifying hardware buffer size or hardware allocation;
   said packet translation unit translating said PWA address into said physical address and redirecting loads and stores of said PWA into at least one data buffer in a system memory.

7. The computer storage medium storing a computer program product for implementing virtual packet storage as recited in claim 6 wherein the step of mapping packet data for said PID into said PWA includes the step of allocating said packet data in buffers.

8. The computer storage medium storing a computer program product for implementing virtual packet storage as recited in claim 7 includes the step of providing a buffer descriptor for said packet data.

9. The computer storage medium storing a computer program product for implementing virtual packet storage as recited in claim 8 wherein the step providing said buffer descriptor for said packet data includes the steps of storing a pointer in said buffer descriptor to a data buffer, said data buffer for storing said packet data; and storing a pointer to a next buffer descriptor.

* * * * *

UNITED STATES PATENT AND TRADEMARK OFFICE
CERTIFICATE OF CORRECTION

PATENT NO. : 7,660,908 B2  Page 1 of 1
APPLICATION NO. : 10/427886
DATED : February 9, 2010
INVENTOR(S) : Haselhorst et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1623 days.

Signed and Sealed this

Thirtieth Day of November, 2010

David J. Kappos
*Director of the United States Patent and Trademark Office*